United States Patent
Suzuki et al.

(10) Patent No.: US 7,880,357 B2
(45) Date of Patent: *Feb. 1, 2011

(54) SINTERED MAGNET AND ROTATING MACHINE EQUIPPED WITH THE SAME

(75) Inventors: Hiroyuki Suzuki, Hitachi (JP); Takao Imagawa, Mito (JP); Yuichi Satsu, Hitachi (JP); Matahiro Komuro, Hitachi (JP); Takashi Yasuhara, Yotsukaido (JP); Yutaka Matsunobu, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/543,068

(22) Filed: Aug. 18, 2009

(65) Prior Publication Data

US 2010/0079025 A1    Apr. 1, 2010

(30) Foreign Application Priority Data

Sep. 29, 2008    (JP) .............................. 2008-249463

(51) Int. Cl.
    *H02K 1/17* (2006.01)
    *H02K 1/27* (2006.01)
    *H01F 1/00* (2006.01)
(52) U.S. Cl. ............................ 310/156.43; 310/156.53; 310/156.56; 310/156.57; 148/302
(58) Field of Classification Search ............ 310/156.01, 310/156.43, 156.53–156.56; 148/100–101, 148/105, 120, 300, 301, 302; 252/62.55, 252/62.59, 62.63, 62.64; 427/127; 428/328, 428/332

See application file for complete search history.

(56) References Cited

U.S. PATENT DOCUMENTS

| 7,696,662 | B2 | 4/2010 | Komuro et al. |
| 2006/0213582 | A1* | 9/2006 | Nakamura et al. .......... 148/302 |
| 2006/0213583 | A1* | 9/2006 | Nakamura et al. .......... 148/302 |
| 2006/0213585 | A1* | 9/2006 | Nakamura et al. .......... 148/302 |

(Continued)

FOREIGN PATENT DOCUMENTS

JP    2003-282312 A    10/2003

(Continued)

OTHER PUBLICATIONS

Hajime Nakamura et al., Magnetic Properties of Extremely Small Nd-Fe-B Sintered Magnets, IEEE Transactions on Magnetics, vol. 41, No. 10, Oct. 2005 p. 3844.

(Continued)

*Primary Examiner*—Tran N Nguyen
(74) *Attorney, Agent, or Firm*—Crowell & Moring LLP

(57) ABSTRACT

A sintered magnet and a rotating machine equipped therewith are disclosed, which include: crystal grains of a ferromagnetic material consisting mainly of iron, and a fluoride compound or an oxyfluoride compound, containing at least one element selected from the group consisting of an alkali metal element, an alkaline earth metal element, and a rare earth element, the fluoride compound or the oxyfluoride compound being formed inside some of the crystal grains or in a part of a grain boundary part. The oxyfluoride compound or the fluoride compound contains carbon, and a grain boundary width of the ferromagnetic material is smaller than a grain boundary width of the ferromagnetic material in which the fluoride compound or the oxyfluoride compound is formed.

13 Claims, 5 Drawing Sheets

U.S. PATENT DOCUMENTS

| | | |
|---|---|---|
| 2006/0222848 A1 | 10/2006 | Satsu et al. |
| 2007/0151632 A1 | 7/2007 | Komuro et al. |
| 2008/0286595 A1 | 11/2008 | Yoshimura et al. |
| 2009/0224615 A1* | 9/2009 | Komuro et al. ............... 310/46 |
| 2010/0007232 A1* | 1/2010 | Komuro et al. ........ 310/156.01 |
| 2010/0079024 A1* | 4/2010 | Komuro et al. ........ 310/156.01 |
| 2010/0141367 A1 | 6/2010 | Komuro et al. |

FOREIGN PATENT DOCUMENTS

| | | |
|---|---|---|
| JP | 2006-261433 A | 9/2006 |
| JP | 2006-283042 A | 10/2006 |
| JP | 2006-303433 A | 11/2006 |
| JP | 2006-303434 A | 11/2006 |
| JP | 2006-303435 A | 11/2006 |
| JP | 2006-303436 A | 11/2006 |
| JP | 2007-194599 A | 8/2007 |
| JP | 2008-60183 A | 3/2008 |
| JP | 2008-61333 A | 3/2008 |
| JP | 2008-130781 A | 6/2008 |
| WO | WO 2007/102391 A1 | 9/2007 |

OTHER PUBLICATIONS

Japanese Office Action dated Jul. 27, 2010 (Four (4) pages).

* cited by examiner

SINTERED MAGNET AND ROTATING MACHINE EQUIPPED WITH THE SAME

INCORPORATION BY REFERENCE

The disclosure of the following priority application is herein incorporated by reference: Japanese Patent Application No. 2008-249463 filed Sep. 29, 2008.

BACKGROUND OF THE INVENTION

1. Field of the Invention

The present invention relates to a sintered magnet, especially a rare earth sintered magnet, and to a rotating machine equipped with the same.

2. Description of Related Art

Conventional rare earth sintered magnets containing fluoride compounds or oxyfluoride compounds are disclosed in Patent Literatures 1 to 6 below. In the conventional technology, the fluoride compound used for processing is in the form of powdery or a mixture of powder of the compound and a solvent, and it is difficult to efficiently form a phase containing fluorine along surfaces of magnetic particles. In the above-mentioned conventional method, the fluoride compound or oxyfluoride compound used for the processing is in point contact with the surface of the magnetic particles, and it is difficult for the phase containing fluorine to come in surface contact with the magnetic particles. Therefore, there have been required a relatively large amount of the processing material and heat treatment at high temperatures according to the conventional method.

Non-Patent Literature 1 discloses a magnet that includes a micro sintered magnet coated on the surface thereof with micro particles (1 to 5 μm) of $DyF_3$ or $TbF_3$. It is described in the above-mentioned literature that Dy and F are absorbed by the sintered magnet to form NdOF and Nd oxide.

[Patent Literature 1] JP-A-2003-282312
[Patent Literature 2] JP-A-2006-303436
[Patent Literature 3] JP-A-2006-303435
[Patent Literature 4] JP-A-2006-303434
[Patent Literature 5] JP-A-2006-303433
[Patent Literature 6] JP-A-2008-061333
[Non-Patent Literature 1] IEEE TRANSACTIONS ON MAGNETICS and VOL. 41 No. 10 (2005) Page 3844

SUMMARY OF THE INVENTION

Conventionally, pulverized powder of a fluoride compound or the like has been used as a material for forming a stack of phases that contain fluorine on NdFeB magnetic particles. Use of the pulverized powder of the fluoride compound or the like results in that not a small portion of the fluoride compound or the like remains to be dispersed into the inside of the magnet. In addition, magnets with coercive force more than necessary means that the fluoride compounds or the like are wasted. Therefore, the fluoride compounds or the like have not been used efficiently.

It has been difficult to use the conventional techniques to magnets with thicknesses exceeding 10 mm because there is a tendency that the concentrations of heavy rare earth elements and/or fluorine are decreased from the surface of the magnet toward the inside thereof.

Therefore, it is an object of the present invention to decrease the amount of the fluoride compounds or oxyfluoride compounds and achieve coating with improved uniformity, more particularly to provide a sintered magnet and a rotating machine equipped with the same that include decreased amounts of rare earth elements used in a motor.

According to a first aspect of the present invention, the sintered magnet comprises: crystal grains of a ferromagnetic material consisting mainly of iron, and a fluoride compound or an oxyfluoride compound, containing at least one element selected from the group consisting of an alkali metal element, an alkaline earth metal element, and a rare earth element, the fluoride compound or the oxyfluoride compound being formed inside some of the crystal grains or in a part of a grain boundary part, wherein the oxyfluoride compound or the fluoride compound contains carbon, and a grain boundary width of the ferromagnetic material is smaller than a grain boundary width of the ferromagnetic material in which the fluoride compound or the oxyfluoride compound is formed.

In the first aspect, the fluoride compound or the oxyfluoride compound on a surface of the ferromagnetic material may have a concentration higher than that of the fluoride compound or the oxyfluoride compound inside the ferromagnetic material. Also, the rare earth element near the grain boundary may have a concentration higher than that of the rare earth element inside the grain.

According to a second aspect of the present invention, the rotating machine comprises a stator, a rotor, and a magnet, wherein the rotor has a magnet inserting hole, the magnet inserting hole being provided with a sintered magnet, a fluoride compound or an oxyfluoride compound, containing at least one element selected from the group consisting of an alkali metal element, an alkaline earth metal element, and a rare earth element, is formed inside some of the crystal grains or in a part of a grain boundary part, the oxyfluoride compound or the fluoride compound contains carbon, and a grain boundary width of the ferromagnetic material is smaller than a grain boundary width of the ferromagnetic material in which the fluoride compound or the oxyfluoride compound is formed.

In the second aspect, the fluoride compound or the oxyfluoride compound on a surface of the ferromagnetic material may have a concentration higher than that of the fluoride compound or the oxyfluoride compound inside the ferromagnetic material.

In the second aspect, a distribution of concentration of the fluoride compound or the oxyfluoride compound may be asymmetric as seen from a center of a magnetic pole of the rotor.

In a third aspect of the present invention, the rotating machine with a sintered magnet rotor comprises in the rotor: a ferromagnetic material consisting mainly of iron to be sintered; a fluoride compound or an oxyfluoride compound being formed inside some of the crystal grains or in a part of a grain boundary part of the ferromagnetic material; and at least one of an alkali metal element, an alkaline earth metal element, and a rare earth element, contained in the fluoride compound or the oxyfluoride compound; and a portion of the fluoride compound or the oxyfluoride compound being distributed with a gradient of concentration thereof from a surface of the ferromagnetic material to the inside thereof, and a rare earth element being distributed with a gradient of concentration thereof between a grain boundary surface and a matrix of the ferromagnetic material, wherein the oxyfluoride compound or the fluoride compound contains carbon, a grain boundary width of the ferromagnetic material is smaller than a grain boundary width of the ferromagnetic material in which the fluoride compound or the oxyfluoride compound is formed, and a distribution of concentration of the fluoride compound or the oxyfluoride compound is asymmetric as seen from a center of a magnetic pole of the rotor.

In the third aspect, the rotating machine further comprises: a fluorinated part constituted by the ferromagnetic material being fluorinated with the fluoride compound or the oxyfluoride compound, wherein the fluorinated part is narrower in a central portion in an axial direction of the rotor and wider at both ends that are remote from the central portion in the axial direction of the rotor.

The present invention can provide a magnet that realizes high resistivity, high coercivity, high magnetic flux density or a decrease in usage of heavy rare earth elements and a magnetic circuit allowing for low iron loss or high induced voltage.

DESCRIPTION OF PREFERRED EMBODIMENTS

Figure 1:
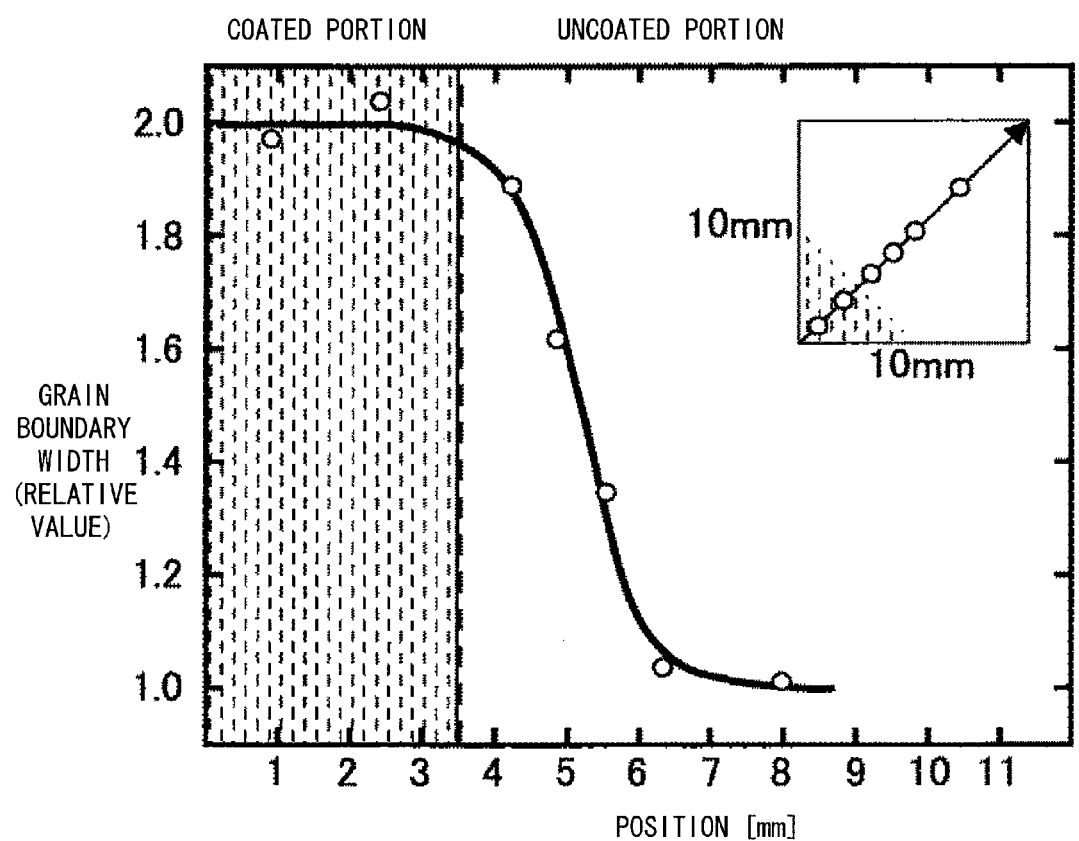
FIG. 1 is a graph illustrating position dependence of the grain boundary width of a sintered magnet.

Embodiments of the present invention will be described below with reference to the drawings.

To achieve this object, different methods are used for a thick magnet and a thick magnet. In both the methods, first a solution of a fluoride compound is used, which solution is light-transmissive and contains no minute particles. In the case of the thin magnet having a thickness of, for example, 10 mm or less, a low viscosity solution of the fluoride compound can be coated on an area of the sintered body where an alternating magnetic field is largely applied and the coated fluoride compound is thermally diffused into the inside of the sintered body to selectively impart the magnet with high coercivity. On the other hand, in the case of a thick magnet having a thickness of, for example, 10 mm or more, two methods are used. According to one method, a solution having a low viscosity is partially impregnated into a low density compact, which is then sintered. Alternatively, surface-treated magnetic particles, i.e., magnetic particles coated on the surface thereof with a fluoride compound are provided in advance and upon mixing with non-surface treated magnetic particles, the surface-treated magnetic particles are arranged in a focused way on a site where high coercivity is required, and preliminarily molded and sintered. Hereinafter, the thin magnet and the thick magnet in this order are explained for their respective methods taking NdFeB sintered magnets as examples. Obviously, combinations of the respective methods need be practiced in some cases.

In the case of the thin magnet, a distance along which the fluoride compound is diffused into the magnet body can be sufficiently secured by a grain boundary diffusion method. The surface of the sintered body preferably is not oxidized. The fluoride compound solution preferably is highly transmissive, has light transmitting property, or has a low viscosity. Use of such a solution allows for the formation of a uniform thin film on the surface of the sintered body, so that the fluoride compound can be efficiently thermally diffused into the sintered body. The sintered bodies have different sites where alternating magnetic field is intensively applied depending on the position at which they are used in the rotating machine. Accordingly, taping is performed where high coercivity is unnecessary so that the fluoride compound can be coated in a manner concentrated at positions where the alternating magnetic field is intense and high coercivity is required. An adsorptive tape is used which provides no gap between the magnet body and it to cover and the covered magnet body is soaked in the fluoride compound solution. Thereafter, the solvent is removed in a vacuum drying furnace. Coating and vacuum drying is repeated in a plurality of times to adjust the coated amount of the fluoride compound to appropriate levels. Then, the tape is removed and the residual solvent is removed by heat treatment at 200° C. to 400° C. The heat treatment is performed under a vacuum of $1 \times 10^{-3}$ Pa or less, at a temperature of 500° C. to 800° C. for 30 minutes or longer, so that carbon, rare earth elements, and elements that constitute the fluoride compound are diffused to between the fluoride compound and the magnetic particles and/or grain boundaries.

In the case of the thick magnet, the distance along which the fluoride compound is diffused into the magnet body can be sufficiently secured by an impregnation method or a localized arrangement method. A preformed body obtained by forming magnetic particles with adjusted particle size distribution in a magnetic field has gaps between the magnetic particles. Accordingly, even the inside of the preformed body can be coated with the fluoride compound solution by impregnating the fluoride compound solution at positions where high coercivity of the magnet body is required. In this case, it is preferred that the fluoride compound solution is highly transparent, light-transmissive, or low in viscosity. Use of such a solution allows the fluoride compound solution to penetrate into minute gaps between the magnetic particles. The impregnation can be performed by contacting a part of the preformed body with the fluoride compound solution. The fluoride compound solution is coated along the surface of the preformed body on which the fluoride compound solution is in contact. If the coated surface has gaps of from 1 nm to 1 mm, the fluoride compound is impregnated along the surfaces of the magnetic particles surrounding the gaps. The portion to be impregnated is a position at which alternating magnetic field is applied intensely when it is used in the rotating machine, that is, ends of the magnet. The ends correspond to faces parallel to or sides perpendicular to the orientation direction of the preformed body. There is observed a difference in concentration of some of constituent elements of the fluoride compound after sintering between the surface which the fluoride compound solution for impregnation contacts and neighboring non-contact surface. The fluoride compound solution is a solution of a fluoride compound or a fluoride oxide compound that partially contains oxygen (hereafter, referred to as "oxyfluoride compound"), which contains at least one of alkali metal elements, alkaline earth metal elements, or rare earth elements and carbon having a structure similar to that of amorphous carbon. The impregnation treatment can be performed at room temperature. The impregnated solution is heat treated at 200° C. to 400° C. to remove the solvent and further heat treatment at 400° C. to 800° C. under a vacuum of $1 \times 10^{-3}$ Pa or lower results in diffusion of carbon, rare earth elements and elements that constitute the fluoride compound in between the fluoride compound and the magnetic particles as well as grain boundaries.

Use of the above-mentioned treatment solution enables the fluoride compound to be diffused inside the magnetic body at relatively low temperatures within the range of 200° C. to 1,000° C.

According to another localization method, the above-mentioned fluoride compound solution is coated on magnetic particles that have been adjusted for their particle size distribution and the solvent is removed. When the magnetic particles with the fluoride compound adhering on the surface thereof are charged in a mold, they are introduced into a portion where high coercive force is required and the rest portion is filled with non-treated magnetic particles. Thereafter, a preformed body is fabricated by performing the forming in a magnetic field. Heat treatment at a vacuum of $1 \times 10^{-3}$ Pa or less, at a temperature of 400° C. to 800° C. allows carbon, rare earth elements, and elements that constitute the fluoride compound to be diffused in between the fluoride compound and the magnetic particles and/or grain boundaries. The fluoride compound is dispersed inside of the magnetic bodies and sintered at relative low temperatures within the ranges of 200° C. to 1,000° C.

The diffusion heat treatment effects diffusion of iron atoms in the magnetic particles and rare earth elements, and oxygen into the fluorine compound so as to appear in $REF_3$, $REF_2$ or RE (OF), or grain boundaries of these compounds. In the case of grain boundary diffusion method, there are some portions where the fluoride compound does not diffuse depending on the width of the grain boundary. On the contrary, in the case of the impregnation method, diffusion occurs along the gap penetrating from the surface of the formed body, so that a grain boundary phase containing fluorine is formed in the magnet after sintering as a continuous layer extending from the surface into the inside. This can be confirmed by elemental analysis using an electron microscope. The driving force of diffusion is provided by temperature, stress (strain), a difference in concentration, defects, or the like.

The magnetic particles include oxygen at a concentration of 10 to 5,000 ppm. Other impurity elements include light elements such as H, C, P, Si, and Al. The oxygen included in the magnetic particles exists in the forms of not only rare earth oxides and oxides of light elements such as Si and Al but also in the form of oxygen-containing phases that have compositions that are deviated from the stoichiometric composition in the parent phase or matrix. Such oxygen-containing phases reduce the magnetization intensity of the magnetic particles and affect the shape of the magnetization curve. Specifically, these lead to a decrease in remanent magnetic flux density, a decrease in anisotropic magnetic field, a decrease in squareness of demagnetization curve, a decrease in coercivity, an increase in irreversible demagnetizing factor, an increase in heat demagnetization, variation in magnetizing characteristics, deterioration of anticorrosion, a reduction in mechanical characteristics, and so on. Therefore, the reliability of the magnet is decreased. Since oxygen affects many characteristics as mentioned above, processes for preventing oxygen from remaining in the magnetic particles have been studied. The NdFeB magnetic powder includes magnetic particles containing a phase having a crystal structure equivalent to that of $Nd_2Fe_{14}B$ in the main phase. The main phase may contain transition metals such as Al, Co, Cu, Ti, etc. A portion of B may be substituted by C. Compounds such as $Fe_3B$ or $Nd_2Fe_{23}B_3$, etc or oxides corresponding to them may be contained in a layer other than the main phase. Since the fluoride compound layer exhibits resistance higher than that of NdFeB magnetic powder at 800° C. or lower, it is possible to increase resistance of the NdFeB sintered magnet by forming the fluoride compound layer so that the loss can be reduced. The fluoride compound layer may contain besides the fluoride compound such impurities that have little influence on magnetic properties and exhibit no ferromagnetism at around room temperature. In order to obtain a high resistance or improve the magnetic properties, the fluoride compound may contain fine particles of nitrides or carbides.

Such magnets can be fabricated with reduced amounts of heavy rare earth elements. Therefore, the sintered magnets with high energy product can be manufactured, and they can be applied to high torque rotating machines.

First Embodiment

Magnetic powder with an average particle diameter of 5 μm consisting mainly of $Nd_2Fe_{14}B$ and containing about 1% boride and a rare earth-rich phase is prepared as an NdFeB series magnetic powder. The magnetic particles are charged in a mold and pressed at a load of 1 t/cm$^2$ in a magnetic field of 1 T to prepare a preformed body. The preformed body is sintered at a temperature between 1,000° C. and 1,150° C. under a vacuum of $1 \times 10^{-3}$ Pa or lower. Surface polishing makes the size of the magnet to 10×10×5 mm$^3$. The orientation direction is a direction of the 5 mm side. The sintered magnet has a coercive force of 10 kOe at 25° C. It is preferred that only the face parallel to or sides perpendicular to the orientation direction of the sintered body, or portions of the sintered body to which an alternating magnetic field is intensely applied or portions where the alternating magnetic field is relatively intense when it is mounted in a motor are soaked in a $DyF_x$ solution. The $DyF_x$ solution is obtained by dissolving Dy $(CH_3COO)_3$ as a starting material with $H_2O$ and adding HF thereto to form gelatinous $DyF_3.XH_2O$ or $DyF_3.X(CH_3COO)$ (where X is a positive integer). The resultant is centrifuged to remove the solvent and alcohol is added to make a state of $DyF_x$. To be concrete, the coating solutions for forming rare earth fluoride or alkaline earth metal fluoride coating film are prepared by the following method.

(1) 4 g of a salt having a high solubility to water, such as Dy acetate or for Dy, is added to 100 ml of water, and dissolved completely using a shaker or an ultrasonic stirrer.

(2) HF diluted to 10% is gradually added in an equivalent amount for a chemical reaction to generate $DyF_x$ (x=1 to 3).

(3) The solution in which a gelled precipitation of $DyF_x$ (x=1 to 3) has been generated is stirred for 1 hour or longer using an ultrasonic stirrer.

(4) After centrifuging at 4,000 to 6,000 rpm, the supernatant is removed, and approximately the same volume of methanol is added.

(5) The methanol solution including gelled DyF clusters is stirred to form a complete suspension. The suspension is stirred by an ultrasonic stirrer for 1 hour or longer.

(6) The procedures (4) and (5) are repeated three to ten times until no anions such as acetate ions and nitrate ions are detected.

Figure 2:
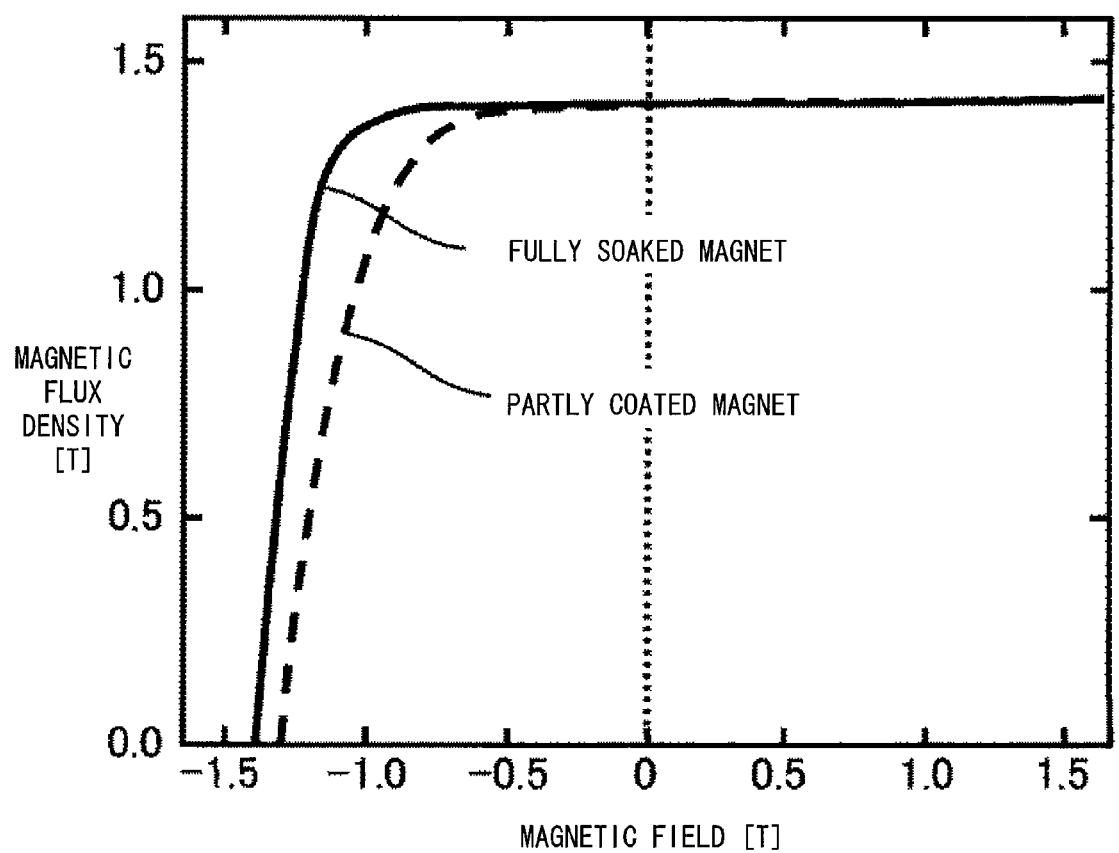
FIG. 2 shows demagnetization curves of a sintered magnet.

For DyF series magnetic particles, substantially transparent sol-like $DyF_x$ is obtained. The treating solution used is a 1 g/5 ml methanol solution of $DyF_x$. Portions of the sintered body that are not desired to be soaked in the solution are covered with a tape that is adherent to the sintered body, and then the sintered body is soaked. This makes it possible to selectively coat the $DyF_x$ treatment solution only at specified target portions. In the first embodiment, taping is performed such that triangular prisms with a bottom of a rectangular equilateral triangle of 5 mm×5 mm and a height of 5 mm in the orientation direction, that is, triangles at four corners of the sintered body can be soaked. The sintered body is soaked in the solution and degasified under vacuum to remove the solvent. The operations of soaking and vacuum degasification are appropriately adjusted depending on the desired coating amounts. In the first embodiment, this procedure is repeated 5 times. Thereafter, heat treatment is performed within a temperature range of 300° C. to 900° C. to diffuse DyF in the inside of the magnet body. Upon sintering, Dy, C, and F that constitute the fluoride compound diffuse along at the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compound and oxyfluoride compound are formed at a threefold area of the grain boundary (grain boundary threefold area), which is comprised by $DyF_3$, $DyF_2$, DyOF, etc. Further, it is revealed that the oxyfluoride compounds and the fluoride compounds contain C. At the grain boundaries, fluorine atoms are detected and Dy is concentrated in a range of 1 nm to 500 nm on average from the grain boundaries. At a distance of 100 nm from the center of the grain boundary, the concentration of Dy in terms of a ratio to Nd (Dy/Nd) is 1/2 to 1/10. FIG. 1 shows the results of crystal grain boundary widths analyzed by using a transmission type electron microscope in a direction of diagonal line from the portion soaked in the solution. Measurements are performed at observation points at a distance of 10 μm to 50 μm from the surface of the particles. The crystal grain boundary as used herein refers to a grain boundary between two crystal grains, a so-called two-layer grain boundary. Seven points in total are observed and average values obtained for respective observation fields are plotted. The portions coated with the $DyF_x$ solution show increased grain boundary widths and non-coated portions show smaller grain boundary widths. The grain boundary widths range from 1.7 to 2 in relative values. FIG. 2 shows demagnetization curves of a partially coated magnet and a fully soaked magnet, respectively, at 25° C. The fully soaked magnet and the partially coated magnet show a reduction in coercive force by 7% to 10% and a reduction in remanent flux density by 0% to 2%. FIG. 2 also shows that demagnetization begins at a low intensity of magnetic field. This means that the coercive force differs from place to place in the magnet body. Such a method of producing a high coercive force magnet using thermal diffusion of elements from the surface of the magnet body is particularly effective when it is applied to the production of magnets having a thickness of 10 mm or less.

Second Embodiment

Magnetic powder with an average particle diameter of 5 μm consisting mainly of $Nd_2Fe_{14}B$ and containing about 1% boride and a rare earth-rich phase is prepared as an NdFeB series magnetic powder. In order to form $DyF_3$ on the surface of the magnetic particles, Dy $(CH_3COO)_3$ as a starting material is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The obtained solution is coated on the magnetic particles, and the solvent is evaporated by vacuum degasification to attach $DyF_x$ to the magnetic particles. The thus obtained magnetic particles are charged in a mold and pressed at a load of 2 t/cm² and in a magnetic field of 1 T to prepare a preformed body. The preformed body is sintered at a temperature between 1,000° C. and 1,150° C. under a vacuum of $1\times10^{-3}$ Pa or lower. Surface polishing makes the size of the magnet to 10×10×10 mm³. As a result, the magnet has a coercive force of 1.2 T to 1.4 T at 25° C. It is preferred that only the face parallel to or sides perpendicular to the orientation direction of the sintered body, or portions of the sintered body to which an alternating magnetic field is intensely applied or portions where the alternating magnetic field is relatively intense when it is mounted in a motor are soaked in a $DyF_x$ solution. The $DyF_x$ solution is prepared by a method which is basically the same as that used for treating the magnetic particles. To be concrete, the coating solutions for forming rare earth fluoride or alkaline earth metal fluoride coating film are prepared by the following method.

(1) 4 g of a salt having a high solubility to water, such as Dy acetate or for Dy, is added to 100 ml of water, and dissolved completely using a shaker or an ultrasonic stirrer.

(2) HF diluted to 10% is gradually added in an equivalent amount for a chemical reaction to generate $DyF_x$ (x=1 to 3).

(3) The solution in which a gelled precipitation of $DyF_x$ (x=1 to 3) has been generated is stirred for 1 hour or longer using an ultrasonic stirrer.

(4) After centrifuging at 4,000 to 6,000 rpm, the supernatant is removed, and approximately the same volume of methanol is added.

(5) The methanol solution including gelled DyF clusters is stirred to form a complete suspension. The suspension is stirred by an ultrasonic stirrer for 1 hour or longer.

(6) The procedures (4) and (5) are repeated three to ten times until no anions such as acetate ions and nitrate ions are detected.

For DyF series magnetic particles, substantially transparent sol-like $DyF_x$ is obtained. The treating solution used is a 1 g/5 ml methanol solution of $DyF_x$. Portions of the sintered body that are not desired to be soaked in the solution are covered with a tape that is adherent to the sintered body, and then the sintered body is soaked. This makes it possible to selectively coat the $DyF_x$ treatment solution only at specified target portions. This time, taping is performed such that triangular prisms with a bottom of a rectangular equilateral triangle of 5 mm×5 mm and a height of 10 mm in the orientation direction, that is, triangles at four corners of the sintered body can be soaked. The sintered body is soaked in the solution and degasified under vacuum to remove the solvent. The operations of soaking and vacuum degasification are appropriately adjusted depending on the desired coating amounts. This procedure is repeated 5 times. Thereafter, heat treatment is performed within a temperature range of 300° C. to 900° C. to diffuse DyF in the inside of the magnet body. Upon sintering, Dy, C, and F that constitute the fluoride compound diffuse along the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compounds and oxyfluoride compounds, which are comprised by $DyF_3$, $DyF_2$, DyOF, etc, are formed at the grain boundary threefold areas. Further, it is revealed that the oxyfluoride compounds and the fluoride compounds contain C. Grain boundary widths are analyzed in the direction of a diagonal line from the portion which is soaked in the solution using a transmission type electron microscope. Measurements are performed at observation points at a distance of 10 μm to 50 μm from the surface of the particles. The crystal grain boundary as used herein refers to a grain boundary between two crystal grains, a so-called two-layer grain boundary. The results obtained show substantially the same tendency as that of the results shown in FIG. 1. As shown in Table 1, relative values of grain boundary width of the soaked portion and the taped portion are 1 to 1.5. In the demagnetization curves of a partially coated magnet and a fully soaked magnet, respectively, the fully soaked magnet and the partially coated magnet show a reduction in coercive force by 2% to 7% and a reduction in remanent flux density by 0% to 5%. It is also revealed that demagnetization begins at a low intensity of magnetic field.

areas. Further, it is revealed that the oxyfluoride compounds and the fluoride compounds contain C. At a distance of 100 nm from the center of the grain boundary, the concentration of Dy in terms of a ratio to Nd (Dy/Nd) is 1/2 to 1/10. Crystal grain boundary widths are analyzed by using a transmission type electron microscope in a direction of diagonal line from the portion soaked in the solution. Observation points are in a cross-section at about the center of 15 mm length, where measurements are made. As shown in FIG. 1, the grain boundary widths in the coated portions and the central portions are

TABLE 1

| Sample | Grain boundary width (relative value) (Soaked, impregnated, localized portion/non-soaked, non-impregnated, non-localized portion) | Magnetic properties (Fully coated, fully arranged, fully impregnated magnet) | |
|---|---|---|---|
| Example 1 | 1.7-2 | Br: 0% to −2% | Hcj: −7% to −10% |
| Example 2 | 1-1.5 | Br: 0% to −5% | Hcj: −2% to −8% |
| Example 3 | 1.7-2 | Br: 0% to −2% | Hcj: −7% to −10% |
| Example 4 | 1-1.5 | Br: 0% to −5% | Hcj: −2% to −8% |
| Example 5 | 1-1.5 | Br: 0% | Hcj: −2% to −8% |
| Example 6 | 1.1-1.4 | Br: 0% | Hcj: −2% to −8% |

Third Embodiment

Magnetic powder with an average particle diameter of 5 μm consisting mainly of $Nd_2Fe_{14}B$ and containing about 1% boride and a rare earth-rich phase is prepared as an NdFeB series magnetic powder. The magnetic particles are charged in a mold and pressed at a load of 1 t/cm² in a magnetic field of 1 T to prepare a preformed body. The size of the preformed body is set to 10×10×15 mm³. The orientation direction is a direction of the 15 mm side. The preformed body has continuous gaps. It is preferred that only the face parallel to or sides perpendicular to the orientation direction of the sintered body, or portions of the sintered body to which an alternating magnetic field is intensely applied when it is mounted in a motor are soaked in a solution that is optically transmissive. On this occasion, only the four sides of the preformed body which are 15 mm long are soaked in a length of about 2 mm as measured in the diagonal direction.

For comparison, a fully soaked magnet is also fabricated. Dy $(CH_3COO)_3$ as a starting material for the solution is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The solution penetrates into the gaps between the magnetic particles of the preformed body from the soaked portion, and the solution that is optically transmissive is coated on the surface of the magnetic particles. The solvent in the solution is evaporated and the hydrate water is evaporated by heating. Then the preformed body is sintered at a temperature of about 1,100° C. under a vacuum of $1×10^{-3}$ Pa or lower. Upon sintering, Dy, C, and F that constitute the fluoride compound diffuse along the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compounds and oxyfluoride compounds, which are comprised by $DyF_3$, $DyF_2$, DyOF, etc, are formed at the grain boundary threefold from 1.7 to 2 in relative values. In the demagnetization curves, the fully soaked magnet and the partially coated magnet show a reduction in coercive force by 7% to 10% and a reduction in remanent flux density by 0% to 2%. Also, it is revealed that demagnetization begins at a low intensity of magnetic field.

Fourth Embodiment

Magnetic powder with an average particle diameter of 5 μm consisting mainly of $Nd_2Fe_{14}B$ and containing about 1% boride and a rare earth-rich phase is prepared as an NdFeB series magnetic powder. In order to form $DyF_3$ on the surface of the magnetic particles, Dy $(CH_3COO)_3$ as a starting material is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The obtained solution is coated on the magnetic particles, and the solvent is evaporated by vacuum degasification to attach them to the magnetic particles. The thus obtained magnetic particles are charged in a mold and pressed at a load of 2 t/cm² and in a magnetic field of 1 T to prepare a preformed body. The size of the magnet is set to 10×10×15 mm³. The orientation direction is a direction of the 15 mm side. The preformed body has continuous gaps. It is preferred that only the face parallel to or sides perpendicular to the orientation direction of the sintered body, or portions of the sintered body to which an alternating magnetic field is intensely applied when it is mounted in a motor are soaked in a solution that is optically transmissive. On this occasion, only the four sides of the preformed body which are 15 mm long are soaked in a length of about 2 mm as measured in the diagonal direction.

For comparison, a fully soaked magnet is also fabricated. Dy $(CH_3COO)_3$ as a starting material for the solution is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The solution penetrates into the gaps between the magnetic particles of the preformed body from the soaked portion, and the solution that is optically transmissive is coated on the surface of the magnetic particles. The solvent in the solution is evaporated and the hydrate water is evaporated by heating. Then the preformed body is sintered at a temperature of about 1,100° C. Upon sintering, Dy, C, and F that constitute the fluoride compound diffuse along the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compounds and oxyfluoride compounds, which are comprised by $DyF_3$, $DyF_2$, DyOF, etc, are formed at the grain boundary threefold areas. Further, it is revealed that the oxyfluoride compounds and the fluoride compounds contain C. Cross-sections in the direction of the diagonal line from the side soaked in the solution are analyzed by wavelength distributed type X-ray spectroscopy. Concentrations of fluorine in a region from the surface to a depth of 100 μm and concentrations of fluorine of a depth of 4 μm or more near the center of the magnet are measured at ten different places in an area of 100 μm×100 μm. As a result, a ratio of the average of the concentrations of fluorine of a depth of 100 μM to the average of the concentrations of fluorine of a depth of 4 μm or more near the center of the magnet is 1.0±0.5. In the central part of the grain boundary, fluorine atoms are detected whereas Dy is concentrated in a range of 1 nm to 500 nm on average from the central part of the grain boundary. The concentration of Dy in terms of a ratio to Nd (Dy/Nd) at a distance of 100 μm from the center of the grain boundary is from 1/2 to 1/8. Crystal grain boundary widths are analyzed by using a transmission type electron microscope in a direction of diagonal line from the portion soaked in the solution. Observation points are in a cross-section at about the center of a 15 mm length, where measurements are made. The results obtained show substantially the same tendency as those shown in FIG. 1. As shown in FIG. 1, the grain boundary widths in the coated portions and the central portions are from 1 to 1.5 in relative values. In the demagnetization curves, the fully soaked magnet and the partially soaked magnet show a reduction in coercive force by 2% to 8% and a reduction in remanent flux density by 0% to 5%. Also, it is revealed that demagnetization begins at a low intensity of magnetic field.

Fifth Embodiment

Magnetic powder with an average particle diameter of 5 μm consisting mainly of $Nd_2Fe_{14}B$ and containing about 1% boride and a rare earth-rich phase is prepared as an NdFeB series magnetic powder. In order to form $DyF_3$ on the surface of the magnetic particles, $Dy(CH_3COO)_3$ as a starting material is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The obtained solution is coated on the magnetic particles, and the solvent is evaporated by vacuum degasification to attach them to the magnetic particles. The magnetic particles to which $DyF_x$ has been attached are charged along the side where high coercivity is required and non-treated magnetic particles are charged in the rest part of the mold. The magnetic particles are simultaneously introduced through a funnel with a diameter of 2 mm (φ2 mm) at the tip thereof. The funnel is provided with a cock, which allows for the adjustment of the rate at which the magnetic particles are introduced. After filling, the magnetic particles are pressed at a load of 1 t/cm² in a magnetic field of 1 T to form a preformed body. The sizes of the magnet are approximately 10×10×15 cm³. The orientation direction is in a direction of the 15 mm side.

For comparison, a magnet is also fabricated using only the magnetic particles to which $DyF_x$ has been attached. The magnet is sintered at about 1,100° C. under a vacuum of $1\times10^{-3}$ Pa or lower. Upon sintering, Dy, C, and F that constitute the fluoride compound diffuse along the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compounds and oxyfluoride compounds, which are comprised by $DyF_3$, $DyF_2$, DyOF, etc, are formed at the grain boundary threefold areas. Further, it is revealed that the oxyfluoride compounds and the fluoride compounds contain C. Cross-sections in the direction of the diagonal line from the side soaked in the solution are analyzed by wavelength distributed type X-ray spectroscopy. Concentrations of fluorine in a region from the surface to a depth of 100 μm and concentrations of fluorine of a depth of 4 μm or more near the center of the magnet are measured at ten different places in an area of 100 μm×100 μm. As a result, a ratio of the average of the concentrations of fluorine of a depth of 100 μm to the average of the concentrations of fluorine of a depth of 4 μm or more near the center of the magnet is 1.0±0.5. In the central part of the grain boundary, fluorine atoms are detected whereas Dy is concentrated in a range of 1 nm to 500 nm on average from the central part of the grain boundary. The concentration of Dy in terms of a ratio to Nd (Dy/Nd) at a distance of 100 μm from the center of the grain boundary is from 1/2 to 1/8. Crystal grain boundary widths are analyzed by using a transmission type electron microscope in a direction of diagonal line from the portion soaked in the solution. Observation points are in a cross-section at about the center of a 15 mm length, where measurements are made. As shown in FIG. 1, the grain boundary widths in the localized arrangement portions and the central portions are from 1 to 1.5 in relative values. In the demagnetization curves, the magnet in which the magnet particles to which $DyF_x$ has been attached are arranged locally shows a reduction in coercive force by 2% to 8% whereas the remanent flux density shows substantially no changes as compared with the magnet in which only the magnet particles to which $DyF_x$ has been attached are used.

Sixth Embodiment

Magnetic powder with an average particle diameter of 5 μm consisting mainly of $Nd_2Fe_{14}B$ and containing about 1% boride and a rare earth-rich phase is prepared as an NdFeB series magnetic powder. In order to form $DyF_3$ on the surface of the magnetic particles, $Dy(CH_3COO)_3$ as a starting material is dissolved with $H_2O$ and HF is added thereto. By addition of HF, gelatinous $DyF_3.XH_2O$ or $DyF_3.X(CH_3COO)$ (where X is a positive integer) is formed. The resultant is centrifuged to remove the solvent and alcohol is added to the residue to obtain a solution that is optically transmissive. The obtained solution is coated on the magnetic particles, and the solvent is evaporated by vacuum degasification to attach them to the magnetic particles. The magnetic particles to which $DyF_x$ has been attached are charged along the side where high coercivity is required and non-treated magnetic particles are charged in the rest part of the mold. The magnetic particles are simultaneously introduced through a funnel with a diameter of 2 mm (φ2 mm) at the tip thereof. The funnel is provided with a cock, which allows for the adjustment of the speed at which the magnetic particles are introduced. After filling, the magnetic particles are pressed at a load of 1 t/cm² in a magnetic field of 1 T to form a preformed body. The sizes of the magnet are approximately 10×10×15 cm³. The orientation direction is in a direction of the 15 mm side and the preformed body has continuous gaps therein. It is preferred that only the face parallel to or sides perpendicular to the orientation direction of the sintered body, or portions of the sintered body to which an alternating magnetic field is intensely applied when it is mounted in a motor are soaked in a solution that is optically transmissive. On this occasion, only the four sides of the preformed body which are 15 mm long are soaked in a length of about 2 mm as measured in the diagonal direction.

For comparison, a fully soaked magnet is also fabricated using only the magnetic particles to which $DyF_x$ has been attached. Dy $(CH_3COO)_3$ as a starting material for the solution is dissolved with $H_2O$ and HF is added thereto. By addition of HF, gelatinous $DyF_3.XH_2O$ or $DyF_3.X$ $(CH_3COO)$ (where X is a positive integer) is formed. The resultant is centrifuged to remove the solvent and alcohol is added to the residue to obtain a solution that is optically transmissive. The solution penetrates into the gaps between the magnetic particles of the preformed body from the soaked portion, and the solution that is optically transmissive is coated on the surface of the magnetic particles. The solvent in the solution is evaporated and the hydrate water is evaporated by heating. Then the preformed body is sintered at a temperature of about 1,100° C. under a vacuum of $1\times10^{-3}$ Pa or lower. Upon sintering, Dy, C, and F that constitute the fluoride compound diffuse along the surface and the grain boundary of the magnetic particles, and there occurs mutual diffusion in which Dy, C, and F are exchanged with Nd and Fe that constitutes the magnetic particles. In particular, the diffusion in which Dy is exchanged for Nd progresses near the grain boundary, and a structure in which Dy is segregated along the grain boundary is formed there. It is also revealed that the fluoride compounds and oxyfluoride compounds, which are comprised by $DyF_3$, $DyF_2$, DyOF, etc, are formed at the grain boundary threefold areas. Further, it is revealed that the oxyfluoride compounds and the fluoride compounds contain C. Cross-sections in the direction of the diagonal line from the side soaked in the solution are analyzed by wavelength distributed type X-ray spectroscopy. Concentrations of fluorine in a region from the surface to a depth of 100 μm and concentrations of fluorine of a depth of 4 μm or more near the center of the magnet are measured at ten different places in an area of 100 μm×100 μm. As a result, a ratio of the average of the concentrations of fluorine of a depth of 100 μm to the average of the concentrations of fluorine of a depth of 4 μm or more near the center of the magnet is 1.0±0.5. In the central part of the grain boundary, fluorine atoms are detected whereas Dy is concentrated in a range of 1 nm to 500 nm on average from the central part of the grain boundary. Near the portion in which Dy is concentrated, there is found a region in which the concentration of Dy decreases in the direction of from the center of the crystal grain toward the grain boundary. Dy atoms that are added to the inside of the grain in advance diffuse toward the vicinity of the grain boundary. As a result, there is a gradient of concentration of Dy in which the concentration of Dy once decreases from the center of the grain toward the grain boundary and then increases near the grain boundary. The concentration of Dy in terms of a ratio to Nd (Dy/Nd) at a distance of 100 μm from the center of the grain boundary is from 1/2 to 1/6. Crystal grain boundary widths are analyzed by using a transmission type electron microscope in a direction of the diagonal line from the portion soaked in the solution. Observation points are in a cross-section at about the center of a 15 mm length, where measurements are made. As shown in FIG. 1, the grain boundary widths in the localized arrangement portions and the central portions are from 1.1 to 1.4 in relative values. The demagnetization curves indicate that as compared with the fully soaked magnet with the magnetic particles to which $DyF_x$ has been attached, the partially soaked magnet with such magnetic particles being arranged in a localized manner shows a reduction in coercive force by 2% to 8% and that the remanent flux density remains substantially constant.

Seventh Embodiment

The DyF-based processing liquid is prepared by dissolving Dy acetate in water and gradually adding to the resultant solution hydrofluoric acid that has been diluted. The resultant solution containing gel-like precipitation of a fluoride compound in admixture with an oxyfluoride compound and an oxyfluoride carbide compound is stirred with an ultrasonic stirrer. After centrifugation, methanol is added to the sediments to obtain a gelatinous methanol solution, which then is stirred and anions are removed to make the solution transparent. Anions are removed from the processing liquid to such an extent that the optical transmittance of the processing liquid becomes 5% or higher. This solution is impregnated to the preformed body. The preformed body is fabricated by compacting $Nd_2Fe_{14}B$ magnetic powder in a magnetic field of 1 T at a load of 5 t/cm² and has sizes of 10×10×15 mm³ and a density of 60% on average. Thus the preformed body has a density less than 100%, which indicates that there are continuous voids or spaces or gaps in the preformed body. The above-mentioned solution is impregnated in these spaces in amounts of about 0.1 wt % or less. It is preferred that only the face parallel to or sides perpendicular to the orientation direction of the sintered body, or portions of the sintered body to which an alternating magnetic field is intensely applied when it is mounted in a motor are soaked in a solution that is optically transmissive. On this occasion, two sides of the preformed body, which are each 15 mm long and are not disposed on the diagonal line, are soaked in a length of about 2 mm as measured in the diagonal direction. Evacuation results in impregnation of the solution along the spaces, so that the solution is allowed to penetrate further inward. The impregnated preformed body is heated at 200° C. under vacuum to evaporate the solvent of the coating solution. The impregnated preformed body after the evaporation of the solvent is placed in a vacuum heat treatment oven and heated to a sintering temperature of 1,000° C. under vacuum to effect sintering to obtain an anisotropic sintered magnet having a density of 99%. The sintered magnet that has been subjected to the partial impregnation treatment with the DyF-based processing liquid, in comparison with the non-impregnated sintered magnet, has a feature that it includes Dy segregated near the grain boundary and contains F, Nd, and oxygen in large amounts at the grain boundary even in the center of the magnet. Due to the Dy that is present near the grain boundary, coercive force is increased. Thus, the Dy-impregnated sintered magnet exhibits characteristics of a coercive force of 2.5 T and a remanent flux density of 1.5 T at 25° C. The concentrations of Dy and F are higher at portions of the sintered magnet that served as paths of the impregnation than other portions and thus there exist differences in concentration of Dy and F. Continuous fluoride formation occurs in the direction of the diagonal line from the side soaked in the impregnation liquid. This can be confirmed with SEM-EDX, TEM- EDX or EELS and EPMA. Analysis of average concentration of fluorine on a surface of 100 μm square, indicates that the ratio of the average concentration on the surface of the magnet to that of the central portion of the magnet is 1±0.5. The ratios of average concentrations of elements other than fluorine, such as Dy, C, or Nd are each 1±0.5. The impregnation treatment with DyF-based liquid and sintering can provide, in addition to the improvements in the above-mentioned characteristics, at least one of various advantageous effects including improvement of squareness of magnetic properties, an increase in resistance after molding, a decrease in dependence of coercive force on temperature, a decrease in dependence of remanent magnetic flux density on temperature, an improvement of corrosion resistance, an increase in mechanical strength, improvement of heat conductivity, and an improvement of adhesion of magnet. Examples of the fluoride compounds that can be applied to impregnation process include, besides $DyF_3$ from the DyF-based fluoride compounds, LiF, $MgF_2$, $CaF_2$, $ScF_3$, $VF_2$, $VF_3$, $CrF_2$, $CrF_3$, $MnF_2$, $MnF_3$, $FeF_2$, $FeF_3$, $CoF_2$, $CoF_3$, $NiF_2$, $ZnF_2$, $AlF_3$, $GaF_3$, $SrF_2$, $YF_3$, $ZrF_3$, $NbF_5$, AgF, $InF_3$, $SnF_2$, $SnF_4$, $BaF_2$, $LaF_2$, $LaF_3$, $CeF_2$, $CeF_3$, $PrF_2$, $PrF_3$, $NdF_2$, $SmF_2$, $SmF_3$, $EuF_2$, $EuF_3$, $GdF_3$, $TbF_3$, $TbF_4$, $DyF_2$, $NdF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, and $BiF_3$. The fluoride compounds also include compounds that contain any one of the above-mentioned fluoride compounds and at least one of oxygen, carbon and transition metal elements. These fluoride compounds can be formed by impregnation treatment with a solution or liquid that is transmissive to visible light or a liquid whose solvent is composed of a compound that contains a CH group to which a portion of fluorine is connected. As a result of the impregnation treatment with one or more of the above-mentioned fluorine compounds, the fluoride compound(s) or the oxyfluoride compound(s) in the form of plates are observed in the grain boundary and inside the particles.

Eighth Embodiment

Figure 3:
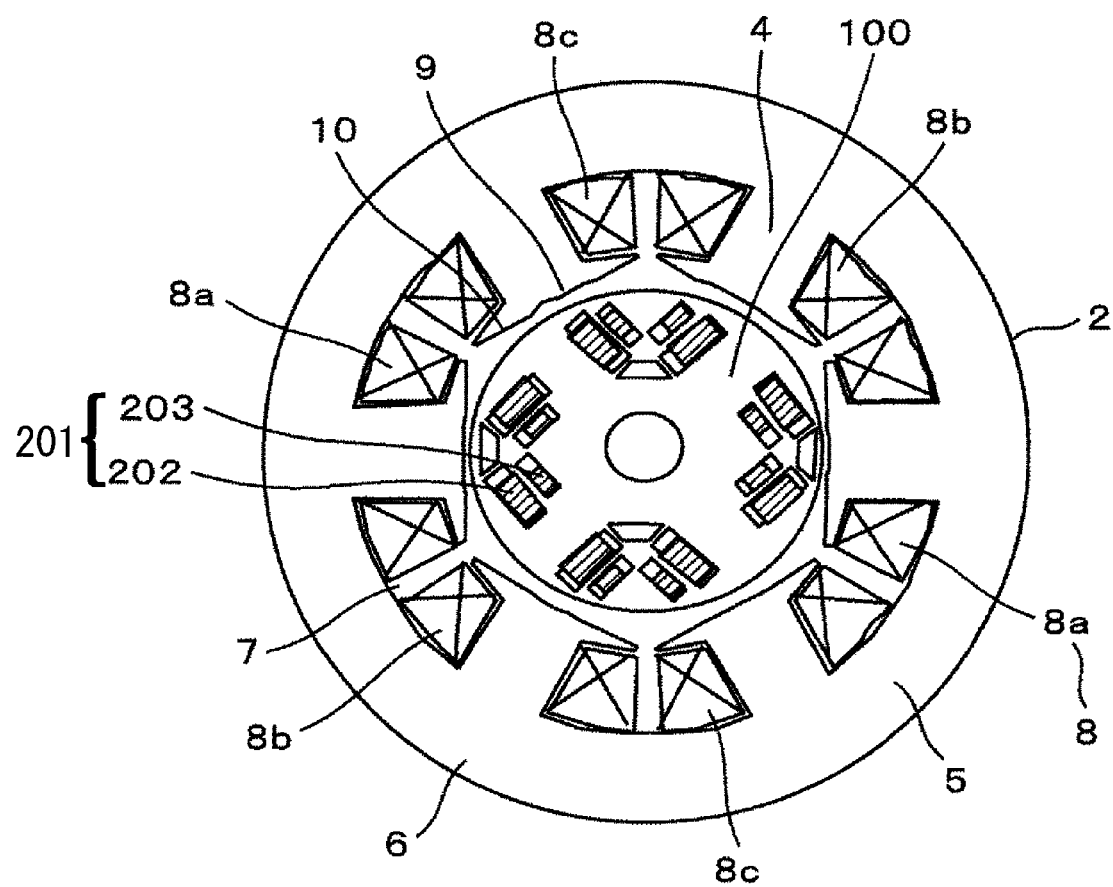
FIG. 3 shows an example of a magnet motor in cross-section.
Figure 4:
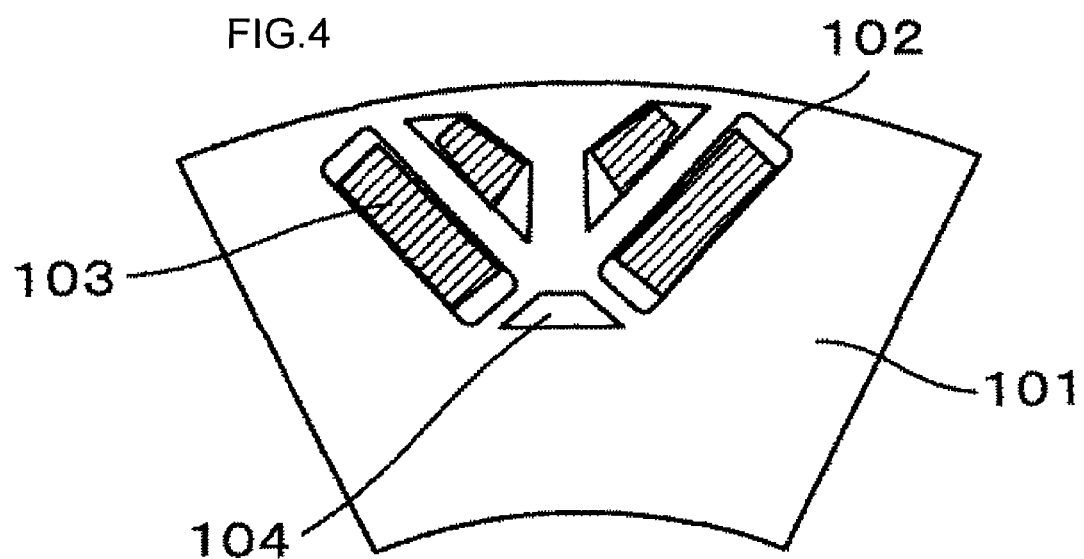
FIG. 4 shows an example of the layout of magnets in a rotor.

Referring to FIG. 3, a motor stator 2 includes a stator iron core 6 having teeth 4 and a core back 5, and an armature winding wire 8 (three-phase winding wires consisting of a U-phase winding wire 8a, a V-phase winding wire 8b, and a W-phase winding wire 8c) in a slot 7 provided between teeth 4, with the armature wiring 8 being wound in a concentrated pattern to surround the teeth 4 for a motor. Since the motor has a 4-pole-6-slot structure, the slot pitch is 120 degrees in terms of electrical angle. A rotor is inserted into a shaft hole 9 or a rotor hole 10, and sintered magnets 201 of which the concentration gradient of fluorine is any one of those shown in the first to sixth embodiments are arranged on the inner periphery side of a rotor shaft 100. The sintered magnets retain thermal resistance due to segregation of a heavy rare earth element such as Dy on a part thereof. They can be used for the production of a motor used at a temperature ranging from 100° C. to 250° C. FIG. 4 shows a cross-section of a rotor, in which instead of arucuate magnets, there is formed a plurality of magnet insertion sections and sintered magnets 201 are arranged in respective magnet insertion sections. The sintered magnets 201 include outer peripheral sintered magnets 202 and inner peripheral sintered magnets 203. Referring to FIG. 4, sintered magnets 103 that have different shapes from each other and have any one of the concentration gradients of fluorine according to the first to sixth embodiments are arranged. The sintered magnets have a cubic shape with corners being cut off. They retain a coercive force, thermal resistance, and corrosion resistance due to segregation of a heavy rare earth element such as Dy in a part of the grain boundary. This arrangement of magnets generates reluctance torque and segregation of fluorine is continuously formed in the grain boundary of the sintered magnets 103, resulting in an increase in a coercive force and an increase in specific resistivity. Accordingly, the motor loss can be reduced. Segregation of Dy results in a decrease in the usage of Dy as compared to the case where no segregation of Dy occurs and the remanent magnetic flux density of the magnet increases. This leads to an improvement of torque.

Ninth Embodiment

Figure 5:
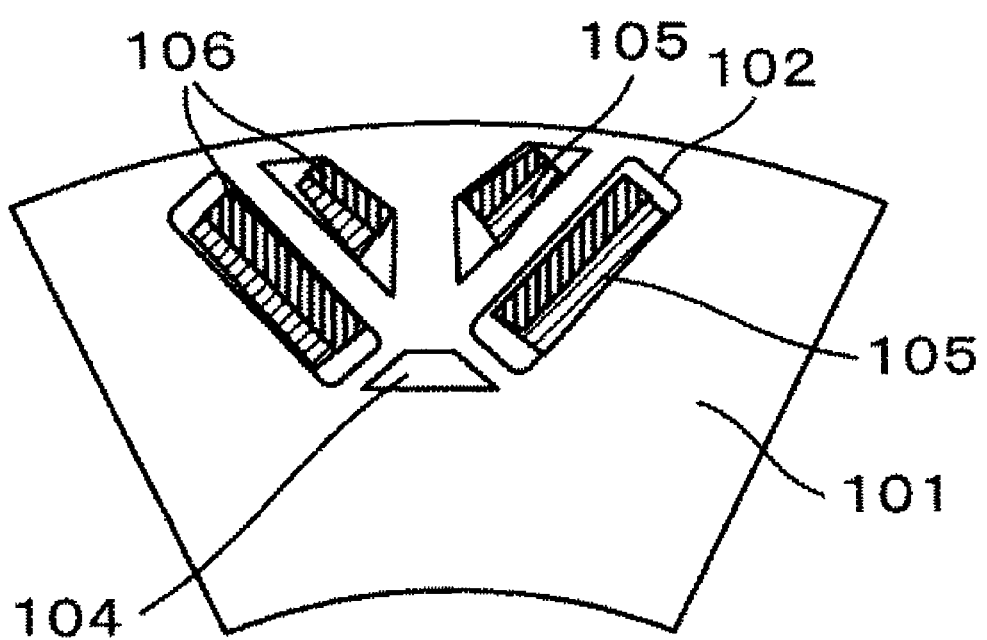
FIG. 5 shows an example of the layout of magnets in a rotor.

FIGS. 4 to 7 each show a cross-sectional configuration of the rotor for each pole. These figures each show a rotor 101 that uses reluctance torque and magnet torque. The rotor 101 is provided with a space 104 in which no magnet is arranged for reluctance torque. A hole is formed in the laminated steel sheets by punching or the like method in advance in a position in which the magnet is to be inserted. This hole serves as a magnet insertion hole 102. The magnet rotor can be fabricated by inserting a sintered magnet 103 in the magnet insertion hole 102. The sintered magnet 103 is a magnet that contains fluorine that has segregated in a part of the grain boundary of the sintered magnet and has magnetic properties of a coercive force of 10 kOe or more and a remanent magnetic flux density 0.6 to 1.5 T. As shown in FIG. 5, sintered magnets having a high concentration of fluorine or a heavy rare earth element are arranged on the inner diameter side and on the outer diameter side near the outer periphery of the rotor in the magnet insertion holes 102. Thus, the pole includes a sintered magnet 106 having a high concentration of fluorine or heavy rare earth element and a sintered magnet 105 having a low concentration of fluorine. Such sintered magnets can be fabricated by coating a solution containing fluorine on one side of the magnet and then allowing the fluorine to diffuse into the magnet. A ratio of fluorine concentrations (maximum concentration/minimum concentration ratio) is 1 to 10,000 on average. It is also possible to increase the coercive force of the magnet 106 having a high concentration of fluorine by causing a metal element to segregate together with the fluorine. The above-mentioned sintered magnets include a material having a high coercive force with a high concentration of fluorine and a material having a high remanent flux density with a low concentration of fluorine. As a result the rotor can achieve a high resistance to demagnetization for an inverse magnetic field during operation and a high torque characteristic. Therefore, the sintered magnets are suitable for an HEV (hybrid electric vehicle) motor.

Figure 6:
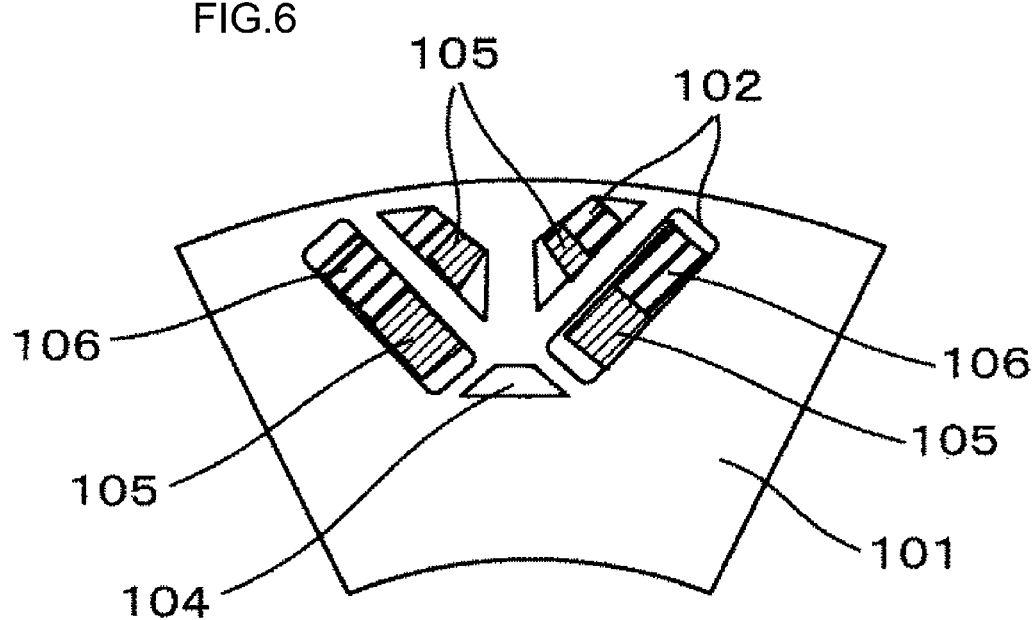
FIG. 6 shows an example of the layout of magnets in a rotor.
Figure 7:
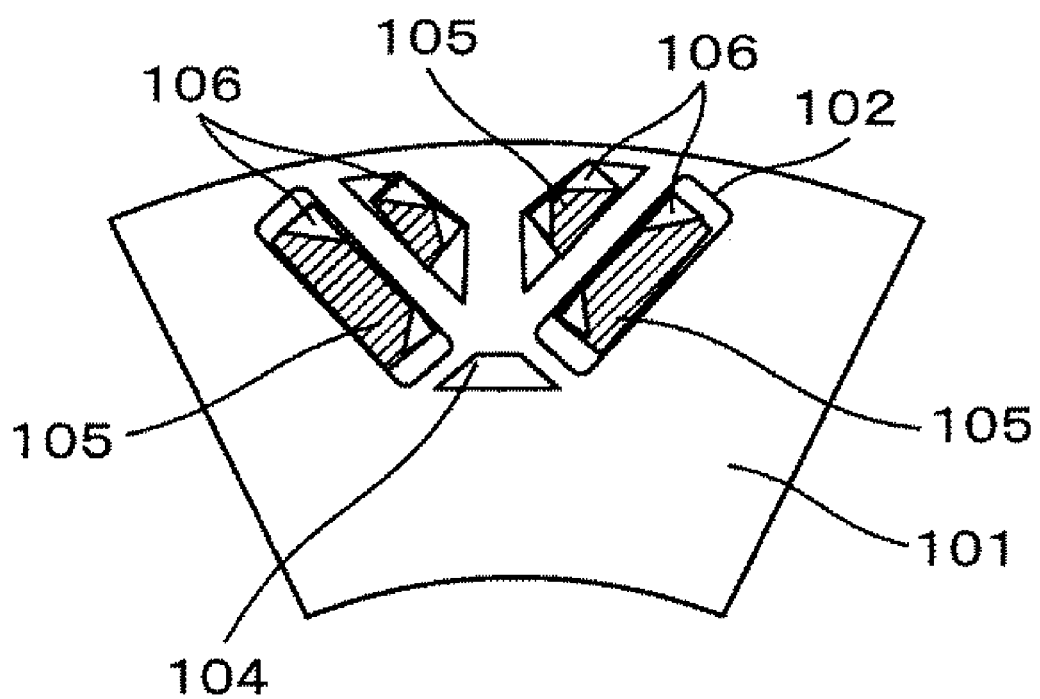
FIG. 7 shows an example of the layout of magnets in a rotor.

Referring to FIG. 6, there are arranged sintered magnets having different fluorine concentrations, i.e., a sintered magnet 106 having a higher fluorine concentration and a sintered magnet 105 having a lower fluorine content in the magnet insertion hole 102 in a direction perpendicular to the axial direction of the rotor. The sintered magnet is fabricated by impregnating preformed compacts prepared using the same mold with a solution containing fluorine from a part of the surface, and drying and sintering the impregnated and non-impregnated compacts such that the impregnated sintered magnet 106 being located on the outer side of the rotor and the non-impregnated sintered magnet 105 being located on the inner side of the rotor. This rotor is high in demagnetization resistance to the inverse magnetic field upon operation and can achieve high torque characteristics, so that it is suitable for an HEV motor and the like. On the other hand, FIG. 7 shows a sintered magnet prepared by impregnating a molded body imparted with anisotropy at corners thereof on the outer side of the molded body and then sintering the impregnated molded body arranged in a direction perpendicular to the axial direction of the rotor in the magnet insertion hole 102. The sintered magnet is fabricated by impregnating preformed compacts prepared using the same mold with a solution containing fluorine from a part of the surface, and drying and sintering the impregnated compacts such that the impregnated sintered magnet 106 being located on the outer side of the rotor and the non-impregnated sintered magnet 105 occupying the rest. This rotor is high in demagnetization resistance to the inverse magnetic field upon operation, can be fabricated using a small amount the fluorine-containing impregnation solution and hence achieve low cost. Therefore it is suitable for an HEV motor and the like. Note that when the solution containing fluorine is impregnated from a corner of the magnet, a solution that also contains fluorine to enable the fluorine and Dy to segregate near the grain boundary of the sintered magnet to increase the coercive force of the sintered magnet. Moreover, by applying the solution to a part of the surface of the magnet by immersion of the magnet or by coating on the magnet, it is possible to make a desired portion (circular, arcuate, rectangular, etc.) to have a high coercive force. Therefore, it is possible to make a part of the corners of the magnet to have a high coercive force as shown in FIG. 7 to increase demagnetization resistance.

The above described embodiments are examples and various modifications can be made without departing from the scope of the invention.

What is claimed is:

1. A sintered magnet comprising:
   crystal grains of a ferromagnetic material comprising iron, and a fluoride compound or an oxyfluoride compound containing at least one heavy rare earth element, the fluoride compound or the oxyfluoride compound being formed inside some of the crystal grains or in a part of a grain boundary part only in a region defined by a triangular prism in at least one corner among four corners of the sintered magnet which is in the form of a rectangular parallelepiped, wherein
   the oxyfluoride compound or the fluoride compound contains carbon, and
   a grain boundary width of the ferromagnetic material is smaller than a grain boundary width of the ferromagnetic material in which the fluoride compound or the oxyfluoride compound is formed.

2. A sintered magnet according to claim 1, wherein
   the fluoride compound or the oxyfluoride compound on a surface of the ferromagnetic material has a concentration higher than that of the fluoride compound or the oxyfluoride compound inside the ferromagnetic material.

3. A sintered magnet according to claim 1, wherein
   the rare earth element near the grain boundary has a concentration higher than that of the rare earth element inside the grain.

4. A rotating machine comprising a stator, a rotor, and a magnet, wherein
   the rotor has a magnet inserting hole, the magnet inserting hole being provided with a sintered magnet in the form of a rectangular parallelepiped comprising crystal grains of a ferromagnetic material comprising iron and a fluoride compound or an oxyfluoride compound containing at least one heavy rare earth element formed inside some of the crystal grains or in a part of a grain boundary part only in a region defined by a triangular prism in at least one corner among four corners of the sintered magnet, wherein
   the oxyfluoride compound or the fluoride compound contains carbon, and
   a grain boundary width of the ferromagnetic material is smaller than a grain boundary width of the ferromagnetic material in which the fluoride compound or the oxyfluoride compound is formed.

5. A rotating machine according to claim 4, wherein
   the fluoride compound or the oxyfluoride compound on a surface of the ferromagnetic material has a concentration higher than that of the fluoride compound or the oxyfluoride compound inside the ferromagnetic material.

6. A rotating machine according to claim 4, wherein
   the rare earth element near the grain boundary has a concentration higher than that of the rare earth element inside the grain.

7. A rotating machine according to claim 4, wherein
   a distribution of concentration of the fluoride compound or the oxyfluoride compound is asymmetric as seen from a center of a magnetic pole of the rotor.

8. A rotating machine with a sintered magnet rotor, the rotor comprising:
   a ferromagnetic material comprising iron to be sintered;
   a fluoride compound or an oxyfluoride compound being formed inside some of the crystal grains or in a part of a grain boundary part of the ferromagnetic material;
   at least one of an alkali metal element, an alkaline earth metal element, and a rare earth element, contained in the fluoride compound or the oxyfluoride compound; and
   a portion of the fluoride compound or the oxyfluoride compound being distributed with a gradient of concentration thereof from a surface of the ferromagnetic material to the inside thereof, and a rare earth element being distributed with a gradient of concentration thereof between a grain boundary surface and a matrix of the ferromagnetic material, wherein
   the oxyfluoride compound or the fluoride compound contains carbon,
   a grain boundary width of the ferromagnetic material is smaller than a grain boundary width of the ferromagnetic material in which the fluoride compound or the oxyfluoride compound is formed, and
   a distribution of concentration of the fluoride compound or the oxyfluoride compound is asymmetric as seen from a center of a magnetic pole of the rotor.

9. A rotating machine according to claim 8, further comprising:
   a fluorinated part constituted by the ferromagnetic material being fluorinated with the fluoride compound or the oxyfluoride compound, wherein
   the fluorinated part is narrower in a central portion in an axial direction of the rotor and wider at both ends that are remote from the central portion in the axial direction of the rotor.

10. A rotating machine according to claim 1, wherein
    the fluoride compound or the oxyfluoride compound is formed by coating a fluoride compound containing at least one heavy rare earth element on the region defined by the triangular prism at least one corner among four corners of the sintered magnet.

11. A rotating machine according to claim 1, wherein
    the fluoride compound or the oxyfluoride compound is formed by covering a region of the sintered magnet other than the region defined by the triangular prism at least one corner among four corners with a tape; and coating a fluoride compound containing at least one heavy rare earth element on the sintered magnet.

12. A rotating machine according to claim 4, wherein
    the fluoride compound or the oxyfluoride compound is formed by coating a fluoride compound containing at least one heavy rare earth element on the region defined by the triangular prism at least one corner among four corners of the sintered magnet.

13. A rotating machine according to claim 4, wherein the fluoride compound or the oxyfluoride compound is formed by covering a region of the sintered magnet other than the region defined by the triangular prism at least one corner among four corners with a tape; and coating a fluoride compound containing at least one heavy rare earth element on the sintered magnet.

\* \* \* \* \*